United States Patent
Shi

(10) Patent No.: US 10,504,061 B1
(45) Date of Patent: Dec. 10, 2019

(54) SYSTEMS AND METHODS FOR MACHINE-LEARNING ASSISTED INVENTORY PLACEMENT

(71) Applicant: Coupang, Corp., Seoul (KR)

(72) Inventor: Xin Shi, Bellevue, WA (US)

(73) Assignee: Coupang, Corporation, Seoul (KR)

( * ) Notice: Subject to any disclaimer, the term of this patent is extended or adjusted under 35 U.S.C. 154(b) by 0 days.

(21) Appl. No.: 16/380,239

(22) Filed: Apr. 10, 2019

(51) Int. Cl.
  *G06Q 10/08* (2012.01)
  *G06N 20/00* (2019.01)
  *G06Q 30/02* (2012.01)

(52) U.S. Cl.
  CPC .......... *G06Q 10/087* (2013.01); *G06N 20/00* (2019.01); *G06Q 10/0838* (2013.01); *G06Q 30/0205* (2013.01)

(58) Field of Classification Search
  CPC ........ G06Q 30/02; G06Q 10/00; G06Q 10/08; G06Q 30/00; G06Q 30/06; G06F 17/30; G06F 17/22
  USPC .................. 705/3, 2, 14.31, 7.12, 14.66, 28
  See application file for complete search history.

(56) References Cited

U.S. PATENT DOCUMENTS

| | | | |
|---|---|---|---|
| 7,987,107 B2 | 7/2011 | Wilson et al. | |
| 8,315,887 B2 * | 11/2012 | Berkelhamer | G16H 40/20 705/3 |
| 8,620,707 B1 * | 12/2013 | Belyi | G06Q 10/087 705/28 |
| 9,208,467 B2 * | 12/2015 | Najmi | G06Q 10/087 |
| 9,488,979 B1 * | 11/2016 | Chambers | G05D 1/0088 |
| 9,489,852 B1 * | 11/2016 | Chambers | B64C 39/024 |
| 9,710,779 B1 * | 7/2017 | Maloney | G06Q 10/0833 |
| 2015/0189482 A1 * | 7/2015 | Yang | H04W 4/12 455/466 |
| 2015/0302481 A1 * | 10/2015 | Callahan | G06Q 30/0269 705/7.29 |
| 2016/0189196 A1 * | 6/2016 | Huh | G06Q 30/0231 705/14.31 |
| 2017/0243240 A1 * | 8/2017 | Seo | G06Q 30/02 |
| 2017/0293624 A1 * | 10/2017 | Lee | H04L 67/306 |

* cited by examiner

*Primary Examiner* — Olusegun Goyea
(74) *Attorney, Agent, or Firm* — Finnegan, Henderson, Farabow, Garrett & Dunner LLP

(57) ABSTRACT

The embodiments of the present disclosure provide systems and methods for managing inventory placement, comprising a memory storing instructions and at least one processor configured to execute the instructions. The processor may be configured to receive an identifier of a product for inventory placement, and determine, based on historical shipment data stored in a database, a region with the highest customer demand for the product. The processor may predict, using a machine learning algorithm, a product tag associated with the product based on at least a temperature associated with the region with the highest customer demand for the product. The processor may further modify the database to assign the product tag to the product identifier, and assign the product for placement in a fulfillment center. The fulfillment center may be associated with a fulfillment center tag corresponding to the product tag assigned to the product.

20 Claims, 11 Drawing Sheets

Favorites Application                                                                login   Sign Up   Service center all My Account   Shopping Cart Shipments  Fast Shipments  Christmas  Gold deals  Regular delivery  Events / Coupons  Planned Exhibition
Gift Cards Home > Food > Daily products / ice cream > Cheese > Fresh cheese > Mozzarella mozzarella cheese
285 Reviews
20,000 won

FREE Shipping
Tomorrow (Wed) 11/28 Arrival Guarantee
Weight per piece x Quantity : 1kg x 2 pieces

| 1 | Add to cart | Buy now |

- Country of origin: See product description
- Shelf Life: 2019-11-04
- Total quantity: 2
- Cheese form: crushed (powder)
- Item Number: 23532 - 3432551

Products purchased by other customers

| Rosé spaghetti sauce, 600g, 2... | Chunky Tomato Pasta... | Grated Parmesan cheese, | Bacon and Mushroom Cream Pasta Sauce | Chili sauce, 295ml, 1 | Hot sauce, |
|---|---|---|---|---|---|
| 6,500 won | 3,800 won | 6,460 won | 4,870 won | 2,370 won | 2,340 won |
| (54 won per 10g) | (86 won per 10g) | (285 won per 10g) | (108 won per 10g) | (80 won per 10ml) | (66 won per 10ml) |
| (3,721) | (545) | (1,330) | (3,193) | (2,552) | (245) |

| Product Details | Reviews (285) | Contact Us | Shipping & Returns |

Required notation information

| Type of food | Natural cheese / frozen products | Producers and Locations | Cheese Corp. / Republic of Korea |
|---|---|---|---|
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and | Content reference | nutrient | None |

Database

| FC Name | FC Location | Temperature Tag (Dec-Feb) | Temperature Tag (Mar-May) | Temperature Tag (Jun-Aug) | Temperature Tag (Sep-Nov) |
|---|---|---|---|---|---|
| FC 1 | Location 1 | FROZEN | FROZEN | FROZEN | FROZEN |
| FC 2 | Location 2 | FROZEN | COLD | COOL | COOL |
| FC 3 | Location 3 | WARM | WARM | HOT | HOT |
| FC 4 | Location 4 | COOL | COOL | COOL | COOL |
| FC 5 | Location 5 | COLD | COOL | WARM | WARM |
| FC 6 | Location 6 | FROZEN | COLD | COOL | COLD |
| FC 7 | Location 7 | WARM | HOT | HOT | WARM |
| FC 8 | Location 8 | FROZEN | COLD | COLD | FROZEN |
| FC 9 | Location 9 | WARM | WARM | WARM | WARM |

Database

| Product ID | Region with Highest Demand | Expected Date of Shipment | Temperature at Region on Expected Date of Shipment | Temperature Tag |
|---|---|---|---|---|
| ID 1 | Region A | April 2 | 75 | WARM |
| ID 2 | Region B | December 22 | 60 | WARM |
| ID 3 | Region C | June 15 | 54 | COOL |
| ID 4 | Region A | September 2 | 72 | WARM |
| ID 5 | Region D | May 17 | 70 | WARM |
| ID 6 | Region E | March 23 | 35 | COLD |
| ID 7 | Region E | June 1 | 67 | WARM |
| ID 8 | Region B | April 25 | 45 | COOL |
| ID 9 | Region F | September 15 | 20 | FROZEN |

FIG. 4B

SYSTEMS AND METHODS FOR MACHINE-LEARNING ASSISTED INVENTORY PLACEMENT

TECHNICAL FIELD

The present disclosure generally relates to computerized systems and methods for managing inventory placement. In particular, embodiments of the present disclosure relate to inventive and unconventional systems related to using one or more machine learning algorithm(s) to optimize inventory placement based on product tags and fulfillment center tags.

BACKGROUND

It has long been recognized that the ability to provide fast delivery service and reduce customer shipment fee is essential to industries participating in e-commerce. When customer orders are made, the orders must be transferred to one or more fulfillment centers so that they can be later transferred to one or more serving areas. In order to minimize shipping costs and delivery time, it would be ideal to place the orders in a fulfillment center closest to the customer's ultimate shipping address. Today, however, most customer orders are made remotely from anywhere around the world. Therefore, with a limited number of fulfillment centers, it has become more challenging to determine where each product should be assigned for inventory placement.

While there is a common understanding that the inventory should be placed close to the customer in order to minimize shipping fees and delivery time, there has yet to be an efficient method for optimizing inventory placement. For example, even today, some companies store winter down jackets and snowshoes in warehouses located in Arizona, which is inefficient because it is less likely that there will be a high customer demand for down jackets and snowshoes in Arizona. As such, when customers order winter down jackets and snowshoes, it is more likely than not that the products will need to travel a longer distance, thereby increasing the delivery time and the customers' shipping costs.

Attempts have been made to provide systems and methods for managing inventory placement that reduce delivery time. For example, U.S. Pat. No. 7,987,107 describes systems and methods for end-to-end fulfillment and supply chain management that has ability to an item to a customer within a delivery timeframe. In order to ensure that items are delivered within the delivery timeframe, the system determines the geographical location associated with the customer and places the item in a shipping warehouse that is nearest to the customer's geographical location.

However, these conventional systems and methods are time-consuming because the customer's shipping location must be determined for every customer order. Therefore, it may be impossible to place products in one or more fulfillment centers prior to receiving a customer order for those products. In addition, many fulfillment centers have restrictions that allow only particular products to be stored in those fulfillment centers. Therefore, it may be difficult to find a fulfillment center that both meets the requirements for each product and is nearest to the customer's shipping location.

Therefore, there is a need for improved systems and methods for managing inventory placement. In particular, there is a need for improved systems and methods for managing inventory placement that has ability to minimize delivery time and shipping fees while obviating the need to determine the customer's shipping location for each product before assigning the product for inventory placement in a fulfillment center.

SUMMARY

One aspect of the present disclosure is directed to a computer-implemented system for managing inventory placement. The system may comprise a memory storing instructions and at least one processor configured to execute the instructions. The at least one processor may be configured to execute the instructions to receive, from a remote system, an identifier of a product for inventory placement, and determine, based on historical shipment data stored in a database, a region with the highest customer demand for the product. The at least one processor may further predict, using a machine learning algorithm, a product tag associated with the product based on at least a temperature associated with the region with the highest customer demand for the product. The at least one processor may further modify the database to assign the product tag to the product identifier, and assign the product for placement in a fulfillment center. The fulfillment center may be associated with a fulfillment center tag corresponding to the product tag assigned to the product. In some embodiments, the fulfillment center tag may match the product tag.

In some embodiments, the fulfillment center tag may be indicative of a temperature associated with a location of the fulfillment center. In some embodiments, the product tag may be dynamically adjustable based on the temperature associated with the region and a date of shipment. In other embodiments, the fulfillment center tag may be dynamically adjustable based on the temperature associated with the location of the fulfillment center.

In some embodiments, the at least one processor may be further configured to modify the database to assign, using the machine learning algorithm, a fulfillment center tag to a fulfillment center based on at least one of a temperature associated with a location of the fulfillment center, a temperature associated with a serving area of the fulfillment center, or a parameter associated with the fulfillment center. The parameter associated with the fulfillment center may comprise at least one of maximum capacity, building restriction, distance between the fulfillment center and the serving area, or number of serving areas.

In some embodiments, the at least one processor may be further configured to store information associated with the product in the database, and train the machine learning algorithm to automatically assign product tags to new products based on the information stored in the database. The information associated with the product may comprise the product tag assigned to the product. In some embodiments, the machine learning algorithm may comprise a classification model.

In yet another embodiment, the at least one processor may be further configured to evaluate at least one of the product tag or the fulfillment center tag periodically. Evaluating at least one of the product tag or the fulfillment center tag may comprise determining the temperature associated with at least one of the product tag or the fulfillment center tag, determining an actual temperature associated with at least one of the region with the highest customer demand for the product or the location of the fulfillment center, calculating a difference between the temperature with the actual temperature, and replacing at least one of the product tag or the fulfillment center tag with a new tag when the difference exceeds a predetermined threshold.

Another aspect of the present disclosure is directed to a computer-implemented method for managing inventory placement. The method may comprise receiving, from a remote system, an identifier of a product for inventory placement, and determining, based on historical shipment data stored in a database, a region with the highest customer demand for the product. The method may further comprise predicting, using a machine learning algorithm, a product tag associated with the product based on at least a temperature associated with the region with the highest customer demand for the product. The method may further comprise modifying the database to assign the product tag to the product identifier, and assigning the product for placement in a fulfillment center. The fulfillment center may be associated with a fulfillment center tag corresponding to the product tag assigned to the product.

In some embodiments, the fulfillment center tag may be indicative of a temperature associated with a location of the fulfillment center. In some embodiments, the product tag may be dynamically adjustable based on the temperature associated with the region and a date of shipment. In other embodiments, the fulfillment center tag may be dynamically adjustable based on the temperature associated with the location of the fulfillment center.

In some embodiments, the method may further comprise modifying the database to assign, using the machine learning algorithm, a fulfillment center tag to a fulfillment center based on at least one of a temperature associated with a location of the fulfillment center, a temperature associated with a serving area of the fulfillment center, or a parameter associated with the fulfillment center. The parameter associated with the fulfillment center may comprise at least one of maximum capacity, building restriction, distance between the fulfillment center and the serving area, or number of serving areas.

In some embodiments, the method may further comprise storing information associated with the product in the database, and training the machine learning algorithm to automatically assign product tags to new products based on the information stored in the database. The information associated with the product may comprise the product tag assigned to the product. In some embodiments, the machine learning algorithm may comprise a classification model.

In yet another embodiment, the method may further comprise evaluating at least one of the product tag or the fulfillment center tag periodically. Evaluating at least one of the product tag or the fulfillment center tag may comprise determining the temperature associated with at least one of the product tag or the fulfillment center tag, determining an actual temperature associated with at least one of the region with the highest customer demand for the product or the location of the fulfillment center, calculating a difference between the temperature with the actual temperature, and replacing at least one of the product tag or the fulfillment center tag with a new tag when the difference exceeds a predetermined threshold.

Yet another aspect of the present disclosure is directed to a computer-implemented system for managing inventory placement. The system may comprise a memory storing instructions and at least one processor configured to execute the instructions. The at least one processor may be configured to execute the instructions to receive, from a remote system, an identifier of a product for inventory placement, and determine, based on historical shipment data stored in a database, a region with the highest customer demand for the product. The at least one processor may further predict, using a classification model, a product tag associated with the product based on at least a temperature associated with the region with the highest customer demand for the product. The at least one processor may further modify the database to assign the product tag to the product identifier, and store information associated with the product in the database. The information associated with the product may comprise the product tag assigned to the product and the product identifier. The at least one processor may further train the classification model to automatically assign product tags to new products, based on the information stored in the database. The at least one processor may further identify a fulfillment center associated with a fulfillment center tag that matches the product tag, and modify the database to assign the product for placement in the identified fulfillment center. The fulfillment center tag may be indicative of a temperature associated with a location of the fulfillment center, and identifying the fulfillment center may comprise determining at least one of maximum capacity or building restriction associated with the fulfillment center. The at least one processor may further evaluate at least one of the product tag or the fulfillment center tag periodically. Evaluating at least one of the product tag or the fulfillment center tag may comprise determining the temperature associated with at least one of the product tag or the fulfillment center tag, determining an actual temperature associated with at least one of the region with the highest customer demand for the product or the location of the fulfillment center, calculating a difference between the temperature with the actual temperature, and replacing at least one of the product tag or the fulfillment center tag with a new tag when the difference exceeds a predetermined threshold.

Other systems, methods, and computer-readable media are also discussed herein.

BRIEF DESCRIPTION OF THE DRAWINGS

FIG. 1C depicts a sample Single Display Page (SDP) that includes a product and information about the product along with interactive user interface elements, consistent with the disclosed embodiments.

FIG. 4A is a diagram of an exemplary database that includes information associated with the fulfillment centers.

FIG. 4B is a diagram of an exemplary database that includes information associated with the products.

DETAILED DESCRIPTION

Figure 1A:
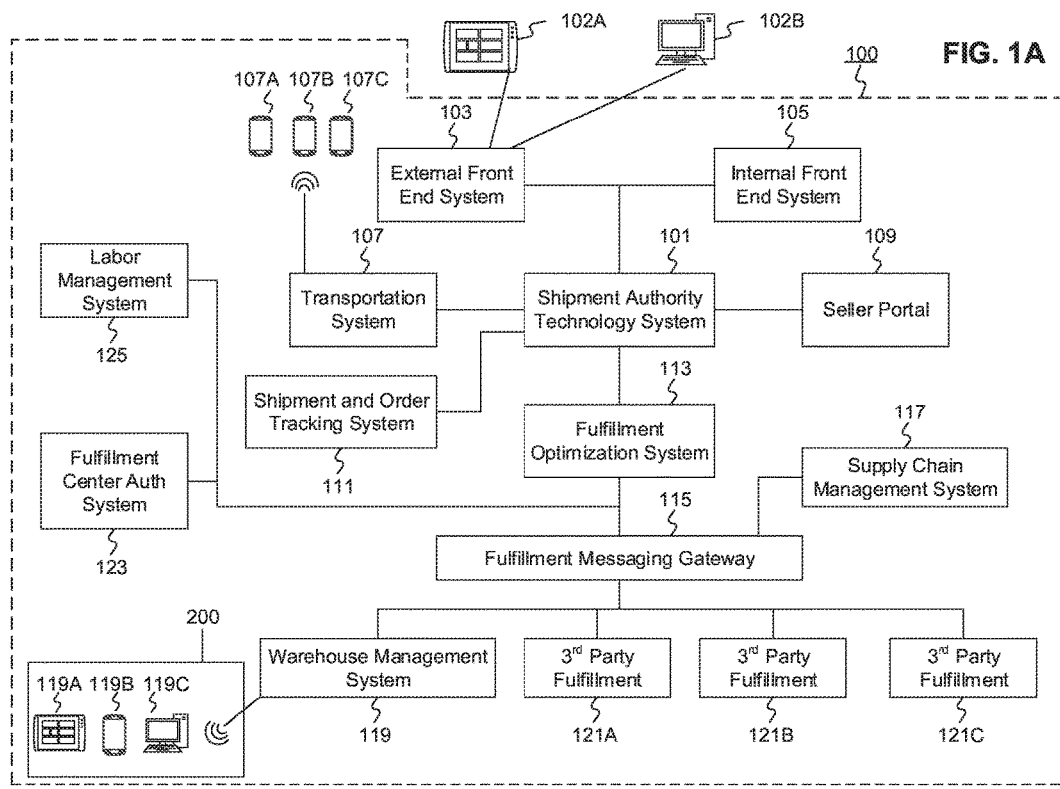
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for simulating outbound flow and optimizing allocation of products, using genetic algorithms.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
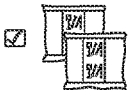
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
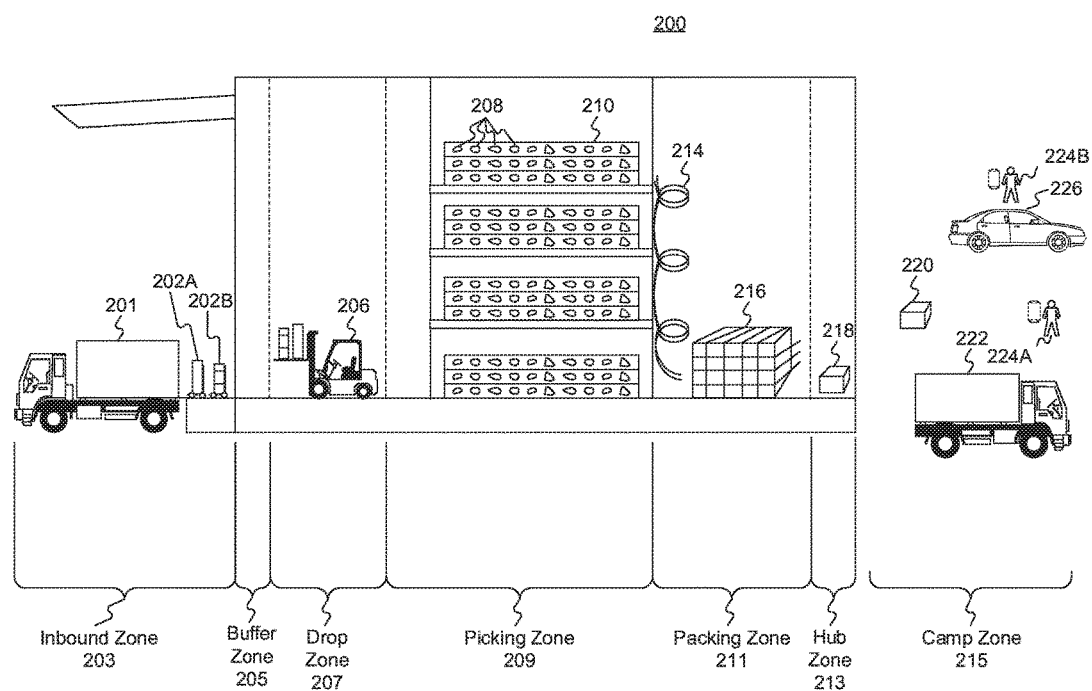
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 2248.

Figure 3:
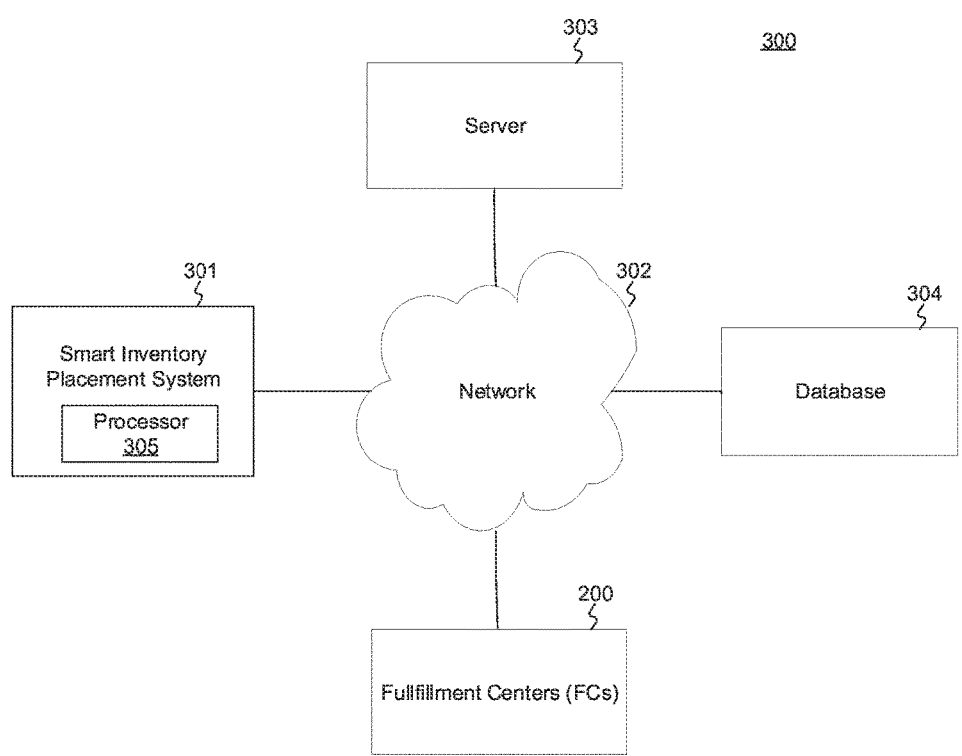
FIG. 3 is a schematic block diagram illustrating an exemplary embodiment of a system comprising a smart inventory placement system for managing inventory placement of products.

Referring to FIG. 3, a schematic block diagram 300 illustrating an exemplary embodiment of a system comprising a smart inventory placement system 301 for managing inventory placement of products. Smart inventory placement 301 may be associated with one or more systems in system 100 of FIG. 1A. For example, smart inventory placement system 301 may be implemented as part of SCM system 117. Smart inventory placement system 301, in some embodiments, may be implemented as a computer system that stores inventory information, as well as information for each FC 200 and information for customer orders from other systems (e.g., external front end system 103, shipment and order tracking system 111, and/or FO system 113). For example, smart inventory placement system 301 may include one or more processors 305, which may store information associated with new products, such as product identifiers and product tags assigned to each product. One or more processors 305 of smart inventory placement 301 may also store information associated with one or more FCs 200, including but not limited to FC tags associated with each FC 200, temperature associated with the location of each FC 200, temperature associated with one or more serving areas of each FC 200, number of serving areas for each FC 200, distance between each FC 200 and its one or more serving areas, building restrictions associated with each FC 200, maximum capacity of each FC 200, and/or any combination thereof. One or more processors 305 of smart inventory placement system 301 may also store a list product identifiers of products assigned for inventory placement at each FC 200. One or more processors 305 may store or retrieve information associated with each FC 200, as well as information associated with products in order to manage inventory placement of products. Tags, such as the product tags and the FC tags, may comprise metadata that describes each product and/or each FC 200. Accordingly, one or more processors 305 may find each product and/or each FC 200 by searching the corresponding tags in database 304. Tags may comprise metadata in the form of words, images, or other identifying marks.

In other embodiments, each of the aforementioned information associated with each FC 200 and/or with each product for inventory placement may be stored in a database 304. As such, smart inventory placement system 301 may retrieve information from the database 304 over network 302. Database 304 may include one or more memory devices that store information and are accessed through network 302. By way of example, database 304 may include Oracle™ databases, Sybase™ databases, or other relational databases or non-relational databases, such as Hadoop sequence files, HBase, or Cassandra. While database 304 is illustrated as being included in the system 300, it may alternatively be located remotely from system 300. In other embodiments, database 304 may be incorporated into smart inventory placement system 301. Database 304 may include computing components (e.g., database management system, database server, etc.) configured to receive and process requests for data stored in memory devices of database 304 and to provide data from database 304.

System 300 may also comprise a network 302 and a server 303. Smart inventory placement system 301, server 303, and database 304 may be connected and be able to communicate with each other via network 302. Network 302 may be one or more of a wireless network, a wired network or any combination of wireless network and wired network. For example, network 302 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving data.

In addition, network 302 may include, but not be limited to, telephone lines, fiber optics, IEEE Ethernet 902.3, a wide area network ("WAN"), a local area network ("LAN"), or a global network such as the Internet. Also network 302 may support an Internet network, a wireless communication network, a cellular network, or the like, or any combination thereof. Network 302 may further include one network, or any number of the exemplary types of networks mentioned above, operating as a stand-alone network or in cooperation with each other. Network 302 may utilize one or more protocols of one or more network elements to which they are communicatively coupled. Network 302 may translate to or from other protocols to one or more protocols of network devices. Although network 302 is depicted as a single network, it should be appreciated that according to one or more embodiments, network 302 may comprise a plurality of interconnected networks, such as, for example, the Internet, a service provider's network, a cable television network, corporate networks, and home networks.

Server 303 may be a web server. Server 303, for example, may include hardware (e.g., one or more computers, including processors, storage, and input/output devices) and/or software (e.g., one or more applications) that deliver web content that can be accessed by, for example a user through a network (e.g., network 302), such as the Internet. Server 303 may use, for example, a hypertext transfer protocol (HTTP or sHTTP) to communicate with a user. The web pages delivered to the user may include, for example, HTML documents, which may include images, style sheets, and scripts in addition to text content.

A user program such as, for example, a web browser, web crawler, or native mobile application, may initiate communication by making a request for a specific resource using HTTP and server 303 may respond with the content of that resource or an error message if unable to do so. Server 303 also may enable or facilitate receiving content from the user so the user may be able to, for example, submit web forms, including uploading of files. Server 303 may also support server-side scripting using, for example, Active Server Pages (ASP), PHP, or other scripting languages. Accordingly, the behavior of server 303 can be scripted in separate files, while the actual server software remains unchanged.

In other embodiments, server 303 may be an application server, which may include hardware and/or software that is dedicated to the efficient execution of procedures (e.g., programs, routines, scripts) for supporting its applied applications. Server 303 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Server 303 may act as a set of components accessible to, for example, an entity implementing system 100, through an API defined by the platform itself.

Smart inventory placement system 301 may also communicate with one or more FCs 200 via network 302. For example, when one or more products are assigned for inventory placement in one or more FCs 200, one or more processors 305 of smart inventory placement system 301 may notify the FCs 200 via network 302. In some embodiments, one or more processors 305 may update a database (not shown) at each FC 200 to record information associated with products being assigned to each FC 200 for inventory placement. As such, each FC 200 may maintain its own database comprising a list of products that are assigned to each FC 200.

As discussed in detail below, one or more processors 305 of smart inventory placement system 301 may implement one or more machine learning algorithm(s) to manage inventory placement of products. In some embodiments, one or more processors 305 of smart inventory placement system 301 may implement a combination of two or more machine learning algorithms to manage inventory placement of products. Machine learning algorithm(s) may comprise, for example, ensemble learning methods such as random forests, artificial neural networks, support vector machines, or any other machine learning algorithms or models for classification and regression analyses.

In some embodiments, one or more processors 305 may use artificial intelligence (AI) and machine learning algorithm(s) to identify future selling products based on different geographical location and assign the products for placement in appropriate FCs 200 in batch for future customer orders. In some embodiments, one or more processors 305 may determine one or more geographical regions, e.g., a postal code, state, municipality, region, or other political or geographical subdivision, with the highest customer demand for a product. Then, one or more processors 305 may determine a temperature associated with the one or more geographical regions with the highest customer demand for the product. Based on the temperature, one or more processors 305 may assign the product for inventory placement in an appropriate FC 200. In some embodiments, the appropriate FC 200 may be located in a geographical region with a temperature similar to the temperature associated with the one or more geographical regions with the highest customer demand for the product. In other embodiments, the appropriate FC 200 may have one or more serving areas with a temperature similar to the temperature associated with the one or more geographical regions with the highest customer demand for the product.

In another embodiment, one or more processors 305 may be able to assign tags, such as temperature tags, to one or more products and/or one or more FCs 200 in database 304 in order to manage inventory placement of products. For example, one or more processors 305 of smart inventory placement system 301 may assign a tag for each FC 200 based on at least a seasonal weather at a location of each FC 200 and a weather associated with the serving area(s) of each FC 200. The tag may be dynamically adjusted and may be evaluated periodically based on the weather. For example, one of FCs 200 may be located in Arizona, and one or more processors 305 may assign a "HOT" temperature tag to FC 200 in Arizona in database 304. When one or more processors 305 receive a product for placement in FC 200, one or more processors 305 may determine a geographical region, e.g., a postal code, state, municipality, region, or other political or geographical subdivision, with the highest customer demand for the product. In some embodiments, based on historical shipment data, one or more processors 305 may determine that a frequent shipping address and/or location associated with the product is in Alaska. Then, one or more processors 305 may assign a tag to the product based on at least a weather at the region with the highest customer demand for the product. If the region with the highest customer demand for the product is Alaska, one or more processors 305 may assign, for example, a "COLD" tag to the product. One or more processors 305 may assign the product to FC 200 with a tag that matches the tag assigned to the product, e.g., FC 200 with a "COLD" tag. One or more processors 305 may store information associated with the products and the FCs 200 in database 304 and use the stored information to train machine learning algorithm(s). Accordingly, one or more processors 305 may use the machine learning algorithm(s) to automatically tag new products and automatically assign new products for placement in appropriate FCs 200. With the temperature tags, one or more processors 305 may determine whether a particular FC 200 would be appropriate for storing a particular product. In the above example, for instance, one or more processors 305 may determine that FC 200 located in Arizona with the "HOT" tag would not be appropriate for storing the product with the "COLD" tag.

In yet another embodiment, one or more processors 305 may be able to implement one or more parameters to the machine learning algorithm(s) to manage inventory placement of products. In some embodiments, one or more parameters may be associated with one or more FCs 200. Parameters associated with FCs 200 may include, for example, maximum capacity of each FC 200, item compatibility associated with each FC 200, costs associated with FC 200, building restriction associated with each FC 200, serving area(s) associated with each FC 200, or any combination thereof. Maximum capacity of each FC 200 may include information associated with how many products can be stored at each FC 200. Item compatibility associated with each FC 200 may include information associated with certain items that cannot be held at certain FCs 200 due to size of the items, weight of the items, need for refrigeration, or other requirements associated with the items. There may also be building restrictions associated with each FC 200 that allow certain items to be held and prevent certain items to be held at each FC 200. Costs associated with each FC 200 may include FC-to-FC transfer costs, cross-cluster shipment costs (e.g., shipping costs incurred from shipping items from multiple FCs 200), shipping costs incurred from cross-stocking items between FCs 200, unit per parcel (UPP) costs associated with having all SKUs in one FC 200, or any combination thereof. Serving area(s) associated with each FC 200 may include number of serving areas associated with each FC 200, geographical locations of the serving area(s) for each FC 200, weather and/or temperature at each of the serving area(s) for each FC 200, and/or distance between the serving area(s) and FC 200 for each FC 200.

In some embodiments, one or more processors 305 may implement one or more of the aforementioned parameters associated with FCs 200 and the weather at the location of each FC 200 in order to assign a tag to each FC 200 in database 304. One or more processors 305 may also implement historical shipment data stored in database 304 in order to assign a tag to each product for inventory placement. Historical shipment data, for example, may contain a list of shipping addresses, at which each product was previously delivered. Therefore, based on the historical shipment data, one or more processors 305 may be able to determine a geographical region, e.g., a postal code, state, municipality, region, or other political or geographical subdivision, with the highest customer demand for a particular product. Accordingly, based on the historical shipment data, one or more processors 305 may assign a tag to each product for inventory placement. One or more processors 305 may be able to store attributes associated with each FC 200 and attributes associated with each product, and train machine learning algorithm(s) to automatically predict and assign a tag for each new product for inventory placement. In some embodiments, the machine learning algorithm(s) may comprise a classification model that can assign each new product to one or more FCs 200 for inventory placement. For example, the machine learning algorithm(s) may comprise ensemble learning methods such as random forests, artificial neural networks, support vector machines, or any other machine learning algorithm(s) or model(s) for classification and regression analyses.

FIG. 4A shows information associated with the FCs 200 that may be stored in a table of exemplary database 304. As discussed above, one or more processors 305 may store one or more parameters associated with each FC 200 in database 304. One or more processors 305 may also assign a tag to each FC 200 and store the tag information in database 304. One or more processors 305 may transmit the information stored in database 304 to one or more systems in system 100. For example, one or more processors 305 may transmit information stored in database 304 to internal front end system 105 to display the results. An exemplary database 304 that stores information associated with each FC 200 is shown in FIG. 4A. As seen in FIG. 4A, one or more processors 305 may determine a geographical location of each FC 200 and store the geographical location in database 304 (e.g., "FC Location"). One or more processors 305 may further modify database 304 to assign one or more tags, such as temperature tags, to each FC 200. The tags may be assigned based on a temperature at a location of each FC 200.

As seen in FIG. 4A, one or more processors 305 may assign the temperature tag based on the seasonable weather at the location of each FC 200. That is, one or more processors 305 may take into consideration differences in temperature due to seasonal changes. As such, one or more processors 305 may assign the temperature tag to each FC 200 based on the average temperature at the location of each FC 200 between the months of December and February, March and May, June and August, and September and November. While in FIG. 4A, one or more processors 305 assign a temperature tag to each FC 200 every 3 months to account for seasonal changes, one or more processors 305 may assign a temperature tag to each FC 200 every month, every 2 months, every 5 months, every 10 months, every year, etc. For example, one or more processors 305 may calculate the average annual temperature at the location of each FC 200 and assign a temperature tag based on the average annual temperature.

The temperature tags assigned to each FC 200 in database 304 may be based on various ranges of temperature values. For example, if the average temperature at a location of a particular FC 200 is less than about 32° F., a "FROZEN" temperature tag may be assigned. If the average temperature at a location of a particular FC 200 is between about 32° F. and about 45° F., a "COLD" temperature tag may be assigned. If the average temperature at a location of a particular FC 200 is between about 45° F. and about 65° F., a "COOL" temperature tag may be assigned. If the average temperature at a location of a particular FC 200 is between about 65° F. and about 80° F., a "WARM" temperature tag may be assigned. If the average temperature at a location of a particular FC 200 is greater than about 80° F., a "HOT" temperature tag may be assigned. Other ranges and tag descriptions are possible and the above ranges and descriptions are merely exemplary.

FIG. 4B shows information associated with the products that may be stored in a table of exemplary database 304. As discussed above, one or more processors 305 may store information associated with each product in database 304. One or more processors 305 may also assign a tag to each product and store the tag information in database 304. One or more processors 305 may transmit the information stored in database 304 to one or more systems in system 100. For example, one or more processors 305 may transmit information stored in database 304 to internal front end system 105 to display the results. An exemplary database 304 that stores information associated with each product is shown in FIG. 4B. As seen in FIG. 4B, one or more processors 305 may, from a remote system, receive one or more products for inventory placement. For example, one or more processors 305 may receive a product identifier (ID) associated with each product for inventory placement. The product ID, for example, may comprise a stock keeping unit (SKU) that identifies the product or a class of products, such as "Item Number" in FIG. 1C.

In some embodiments, one or more processors 305 may look up historical shipment data associated with the product ID in database 304 to determine a region with the highest customer demand for each product. For example, historical shipment data stored in database 304 may comprise shipping addresses, shipping locations, shipping dates, or other shipment information associated with previous customer orders of each product. Based on the historical shipment data stored in database 304, one or more processors 305 may determine a region with the highest customer demand for each product. For example, the region with the highest customer demand may be a shipping location, to which the greatest number of each product was previously shipped. One or more processors 305 may store the determined region with the highest customer demand for each product in database 304 (e.g., "Region A," "Region B," "Region C," etc.).

As seen in FIG. 4B, one or more processors 305 may also determine the expected shipment date for each product. The expected shipment date may be based on the historical shipment data stored in database 304. For example, one or more processors 305 may determine, based on the historical shipment data, a timeframe and/or a date, at which the greatest number of each product was previously shipped. In other embodiments, for example, one or more processors 305 may receive the expected date of shipment with each product when one or more processors 305 receive the product identifier for each product for inventory placement. That is, the expected date may be predetermined when one or more processors 305 receive the one or more product identifier for inventory placement.

One or more processor 305 may also determine a temperature at the region with the highest customer demand for each product at the expected shipment date. By way of example, one or more processors 305 may predict the temperature on the expected date of shipment based on weather forecast data, historical weather data, or weather trends in the particular region. Based on the temperature at the region with the highest customer demand for each product at the expected shipment date, one or more processors 305 may modify database 304 to assign a temperature tag to each product. The temperature tags assigned to each product in database 304 may be based on various ranges of temperature values. For example, if the average temperature at the region with the highest customer demand for each product is less than about 32° F., a "FROZEN" temperature tag may be assigned. If the average temperature at the region with the highest customer demand for each product is between about 32° F. and about 45° F., a "COLD" temperature tag may be assigned. If the average temperature at the region with the highest customer demand for each product is between about 45° F. and about 65° F., a "COOL" temperature tag may be assigned. If the average temperature at the region with the highest customer demand for each product is between about 65° F. and about 80° F., a "WARM" temperature tag may be assigned. If the average temperature at the region with the highest customer demand for each product is greater than about 80° F., a "HOT" temperature tag may be assigned.

Figure 5:
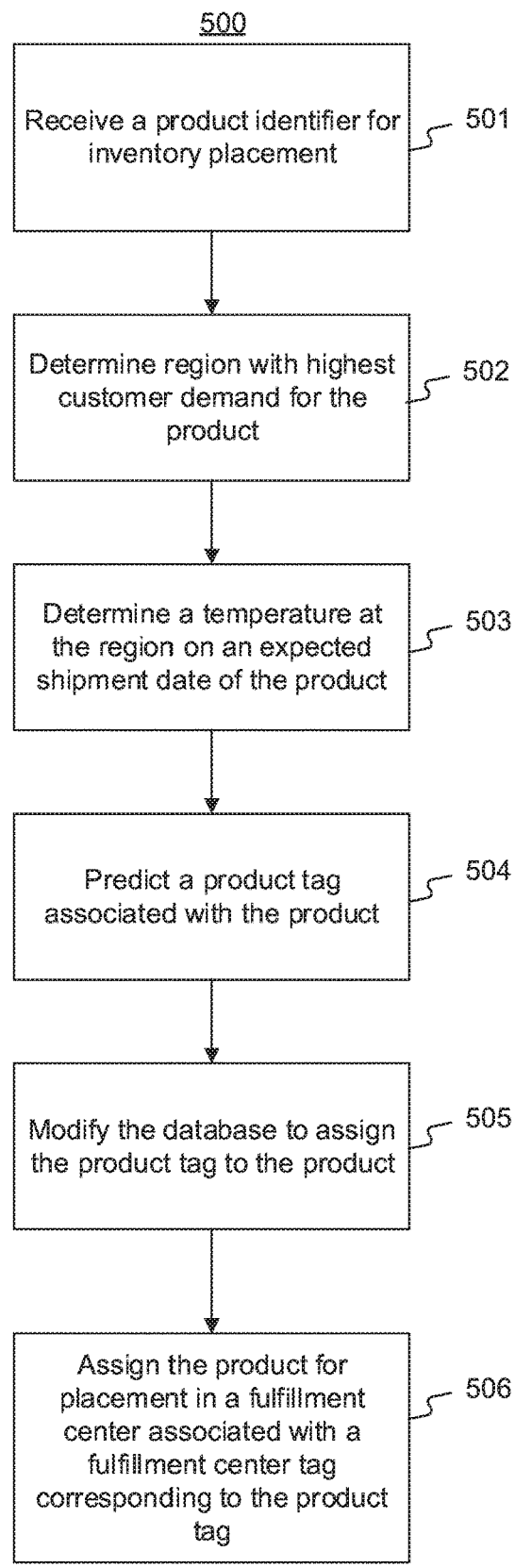
FIG. 5 is a flowchart illustrating an exemplary embodiment of a method for managing inventory placement of products.

FIG. 5 is a flow chart illustrating an exemplary method 500 for managing inventory placement of products. This exemplary method is provided by way of example. Method 500 shown in FIG. 5 can be executed or otherwise performed by one or more combinations of various systems. Method 500 as described below may be carried out by the smart inventory placement system 301, as shown in FIG. 3, by way of example, and various elements of that system are referenced in explaining the method of FIG. 5. Each block shown in FIG. 5 represents one or more processes, methods, or subroutines in the exemplary method 500. Referring to FIG. 5, exemplary method 500 may begin at block 501.

At block 501, one or more processors 305 may receive a product identifier associated with a product for inventory placement. In some embodiments, one or more processors 305 may receive the product identifier from a remote system, such as, one or more systems in system 100 of FIG. 1A. One or more processors 305 may store the product identifier associated with the product in database 304. In some embodiment, the product identifier may comprise a stock keeping unit (SKU) of the product. The SKU may identify the specific product or a class of products. For example, the SKU may be specific to each product, and thus, may be indicative of a manufacturer, material, color, packaging type, weight, or any other characteristic associated with each corresponding product.

Once the product identifier is received for inventory placement, method 500 may proceed to block 502. At block 502, one or more processors 305 may determine a region with the highest customer demand for the product. For example, one or more processors 305 may search through historical shipment data stored in database 304 to determine a shipping history associated with the product. As discussed above, historical shipment data stored in database 304 may comprise a list of shipping addresses, at which the product was previously delivered, a list of customers who previously purchased the product, a quantity of the product purchased by each customer, or any other information related to the purchase history of the product. Based on the historical shipment data, one or more processors 305 may be able to determine a geographical region with the highest customer demand for a particular product. For example, based on the list of shipping addresses, at which the product was previously delivered, one or more processors 305 may determine a geographical region, e.g., a postal code, state, municipality, region, or other political or geographical subdivision, with the highest customer demand for the product.

Once the region with the highest customer demand for the product is determined, method 500 may proceed to block 503. At block 503, one or more processors 305 may determine a temperature at the region with the highest customer demand for the product on an expected date of shipment of the product. As discussed above in reference to FIG. 4B, one or more processor 305 may determine a temperature at the region with the highest customer demand for each product and store the temperature information associated with the product in database 304. One or more processors 305 may determine an expected date of shipment of the product and determine a temperature associated with the region with the highest customer demand for the product on the expected shipment date. The expected date of shipment may be determined based on historical shipment data associated with the product. In other embodiments, the expected date of shipment may be provided by a remote system when one or more processors 305 receive the product identifier associated with the product for inventory placement.

At block 504, one or more processors 305 may predict a product tag associated with the product based on the temperature at the region with the highest customer demand for the product on an expected date of shipment. In some embodiments, one or more processors 305 may automatically predict a product tag associated with the product using machine learning algorithm(s). In some embodiments, the machine learning algorithm(s) may comprise a classification model. For example, the machine learning algorithm(s) may comprise ensemble learning methods such as random forests, artificial neural networks, support vector machines, or any other machine learning algorithm(s) or model(s) for classification and regression analyses. As discussed in further detail below, the machine learning algorithm(s) may use historical shipment data associated with products and FCs stored in database 304 (as illustrated, for example, in FIGS. 4A and 4B), to automatically predict and assign a product tag to each new product for inventory placement.

Once the product tag associated with the product is predicted, method 500 may proceed to block 505. At block 505, one or more processors 305 may modify database 304 to assign the predicted product tag to the product. The product tag assigned to the product may be stored in database 304. In database 304, the product tag assigned to the product may also be associated with the product identifier of the product.

Method 500 may proceed to block 506, at which one or more processors 305 may assign the product for placement in an FC. The FC may be associated with an FC tag that corresponds to the product tag assigned to the product. By way of example, one or more processors 305 may assign the product for placement in an FC with an FC tag that matches the product tag assigned to the product. As seen in FIG. 4A, database 304 may store a list of FCs and their corresponding FC tags, e.g., temperature tags. The FC tag, therefore, may be indicative of a temperature associated with a location of the FC. At block 506, one or more processors 305 may identify an FC in database 304 with an FC tag that matches the product tag assigned to the product and assign the product for placement in the FC. For example, the product may be assigned a "WARM" product tag. One or more processors 305 may identify an FC in database 304 with a "WARM" FC tag on the expected date of shipment of the product and assign the product for placement in the FC.

If there is more than one FC with an FC tag that matches the product tag assigned to the product, e.g., five FCs with the "WARM" FC tag, one or more processors 305 may identify other parameters associated with the one or more FCs and select an optimal FC for the product. For example, one or more processors 305 may determine, among other things, number of serving area(s) for each FC, location of the serving area(s) for each FC, temperature at the serving area(s) for each FC on the expected date of shipment, distance between the FC and the serving area(s), maximum capacity of each FC, building restrictions associated with each FC, or any combination thereof. Based on one or more of the aforementioned parameters, one or more processors 305 may select an optimal FC for the product. In some embodiments, the optimal FC may have one or more serving areas located closest to the region with the highest demand for the product. In other embodiments, the optimal FC may have one or more serving areas that are associated with a temperature closest to the temperature indicated by the product tag assigned to the product. In yet another embodiment, the optimal FC may have the largest capacity and flexible building restrictions to accommodate the requirements for storing the product. For example, if the product must be kept frozen, the optimal FC must have the ability to store and maintain frozen products.

Figure 6:
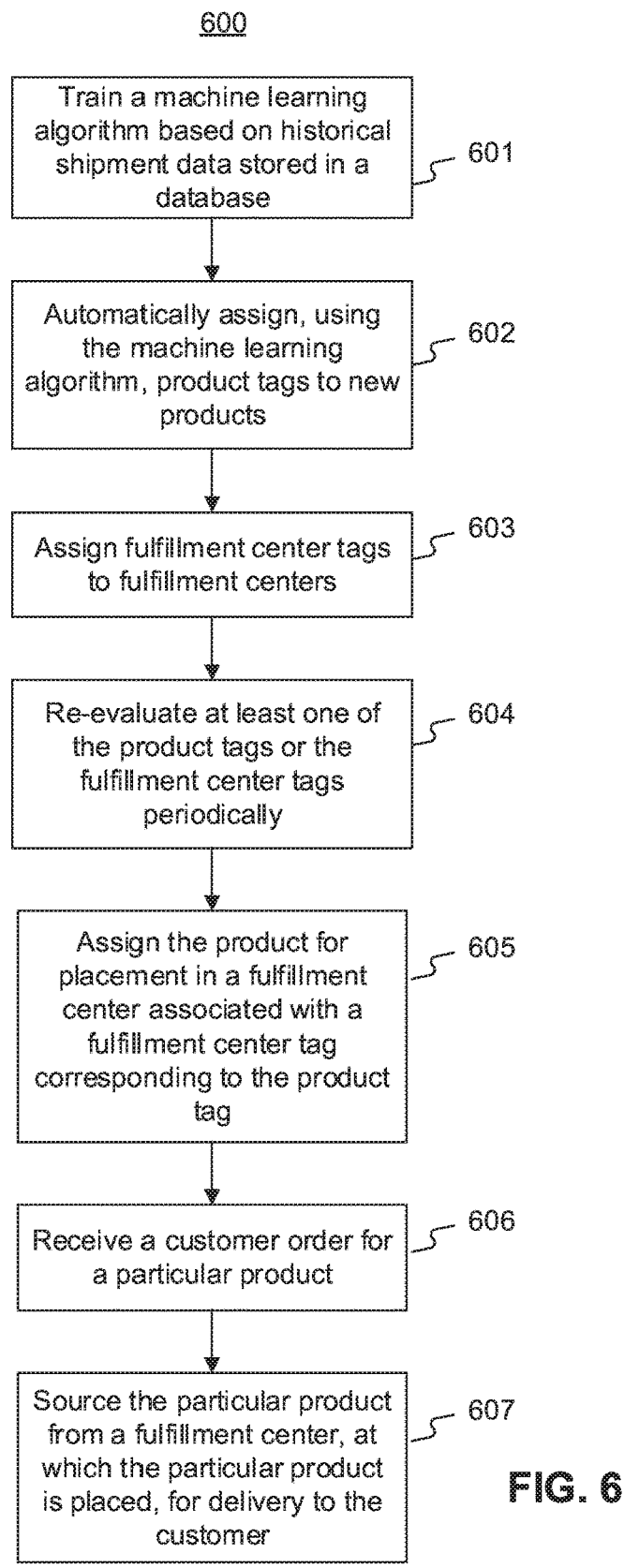
FIG. 6 is a flowchart illustrating another exemplary embodiment of a method for managing inventory placement of products.

FIG. 6 is a flow chart illustrating method 600 for managing inventory placement. This exemplary method is provided by way of example. Method 600 shown in FIG. 6 can be executed or otherwise performed by one or more combinations of various systems. Method 600 as described below may be carried out by the smart inventory placement system 301, as shown in FIG. 3, by way of example, and one or more elements of smart inventory placement system 301 are referenced in explaining the method of FIG. 6. Each block shown in FIG. 6 represents one or more processes, methods, or subroutines in the exemplary method 600. Referring to FIG. 6, exemplary method 600 may begin at block 601.

At block 601, one or more processors 305 may train one or more machine learning algorithm(s) based on historical shipment data stored in database 304. By way of example, one or more processors 305 may store information associated with the products and the FCs in the database over a predetermined period of time, and the stored information may be used to train the machine learning algorithm(s) to automatically assign product tags to new products. The stored information may also be used to train the machine learning algorithm(s) to automatically assign FC tags to one or more FCs. The information may comprise product tags assigned to the products, product identifiers for the products, FC tags assigned to FCs, and any of the information described above in reference to FIGS. 4A and 4B. In some embodiments, the information input and stored in database 304 may comprise information associated with the products, including but not limited to locations and postal codes associated with the product tags assigned to the products, product attributes, and historical shipment data associated with each product. Product attributes may comprise, for example, brand information, manufacturer information, product material, product packaging, product weight, and/or product size. Historical shipment data may comprise, for example, sales history of each product, past shipping addresses associated with each product, and/or quantity of each product previously purchased. One or more processors 305 may also train the machine learning algorithm(s) by implementing one or more business rules. Business rules may comprise parameters associated with one or more FCs, including but not limited to, number of serving area(s) for each FC, location of the serving area(s) for each FC, temperature at the serving area(s) for each FC on the expected date of shipment, distance between the FC and the serving area(s), maximum capacity of each FC, building restrictions associated with each FC, or any combination thereof. In addition, the machine learning algorithm(s) may be trained to automatically assign FC tags to one or more FCs based on factors, including a location of the FC, a temperature at the FC location, temperature at one or more serving area(s) associated with the FC, or any combination thereof. As such, one or more of the aforementioned information, factors, and/or parameters associated with the products and the FCs may be input into the machine learning algorithm(s) to train the machine learning algorithm(s) to automatically assign product tags to new products and FC tags to FCs.

In some embodiments, based on the information input into the machine learning algorithm(s), the machine learning algorithm(s) may calculate a relation between the information associated with each product and a product tag associated with each product. For example, based on the information input into the machine learning algorithm(s), the machine learning algorithm(s) may predict a region with the highest customer demand for a product and a temperature at the region. Accordingly, the machine learning algorithm(s) may generate a correlation between the information associated with each product and a temperature at a region with the highest customer demand for the product. Similarly, the machine learning algorithm(s) may be configured to identify one or more parameters associated with an FC based on historical data stored in database 304 associated with the FC. Based on the one or more parameters associated with the FC, the machine learning algorithm(s) may be used to assign an FC tag to the FC automatically.

Once the machine learning algorithm(s) are trained, method 600 may proceed to block 602. At block 602, based on the correlation generated by the machine learning algorithm(s), one or more processors 305 may automatically assign product tags to new products. That is, based on the correlation generated by the machine learning algorithm(s), one or more processors 305 may use the correlation to automatically assign product tags to new products based on one or more information associated with each new product. At block 603, one or more processors 305 may also assign FC tags to FCs, using the machine learning algorithm(s). As discussed above, one or more processors 305 may obtain information and/or parameters associated with the FCs stored in database 304. Based on information and/or parameters associated with the FCs, one or more processors 305 may use the machine learning algorithm(s) to automatically assign FC tags to one or more FCs.

Once product tags are assigned to new products and FC tags are assigned to FCs, method 600 may proceed to block 604. At block 604, one or more processors 305 may evaluate the FC tags and/or the product tags. In some embodiments, one or more processors 305 may re-evaluate the FC tags and/or the product tags periodically, for example twice a day, once a day, once a week, once a month, etc. Depending on the results of the evaluation, one or more processors 305 may dynamically adjust the FC tags and/or the product tags.

In some embodiments, evaluating the FC tags may comprise determining the temperature associated with the FC tag. For example, referring back to FIG. 4A, evaluating the FC tag for FC 1 may comprise determining that the temperature associated with the FC tag is "FROZEN" throughout the year. Once the temperature associated with the FC tag is determined, one or more processors 305 may determine an actual temperature at the location of the FC. For example, referring again to FIG. 4A, one or more processors 305 may determine an actual temperature at "Location 1," where FC 1 is located. One or more processors 305 may determine the actual temperature based on conventional weather forecast systems. Then, one or more processors 305 may calculate a difference between the temperature associated with the FC tag in database 304 and the actual temperature at the location of the FC. If the difference between the two temperatures exceeds a predetermined threshold, one or more processors 305 may replace the FC tag assigned to the FC with a new FC tag. One or more processors 305 may modify database 304 to assign the new FC tag to the FC. By way of example, referring again to FIG. 4A, one or more processors 305 may determine that the temperature associated with the "FROZEN" temperature tag assigned to FC 1 is 30° F. One or more processors 305 may also determine that the actual temperature at "Location 1" is 40° F. One or more processors 305 may determine that a difference of 10° F. exceeds a predetermined threshold, and thus, may modify database 304 to replace the "FROZEN" tag assigned to FC 1 with a "COLD" tag. In some embodiments, one or more processors 305 may re-evaluate the difference between the temperature associated with the FC tag in database 304 and the actual temperature at the location of the FC a predetermined number of times before replacing the FC tag with a new FC tag. For example, one or more processors 305 may re-evaluate the difference 2 times a day for a period of 2 days to confirm that the difference indeed exceeds a predetermined threshold prior to replacing the FC tag with a new FC tag. If the difference does not exceed a predetermined threshold, one or more processors 305 may maintain the original FC tag assigned to the FC.

Similarly, one or more processors 305 may evaluate the product tags periodically and dynamically adjust the product tags, as needed. Evaluating the product tags may comprise determining the temperature associated with the product tag. For example, referring back to FIG. 4B, evaluating the product tag for product ID 1 may comprise determining that the temperature associated with the product tag is "WARM" on the expected date of shipment. Once the temperature associated with the product tag is determined, one or more processors 305 may determine an actual temperature at the region with the highest customer demand for the product. For example, referring again to FIG. 4B, one or more processors 305 may determine an actual temperature at "Region A," where there is the highest demand for product ID 1. One or more processors 305 may determine the actual temperature based on conventional weather forecast systems. Then, one or more processors 305 may calculate a difference between the temperature associated with the product tag in database 304 and the actual temperature at the region with the highest customer demand for the product. If the difference between the two temperatures exceeds a predetermined threshold, one or more processors 305 may replace the product tag assigned to the product with a new product tag. One or more processors 305 may modify database 304 to assign the new product tag to the product. By way of example, referring again to FIG. 4B, one or more processors 305 may determine that the temperature associated with the "WARM" temperature tag assigned to product ID 1 is 70° F. One or more processors 305 may also determine that the actual temperature at "Region A" is 90° F. One or more processors 305 may determine that a difference of 20° F. exceeds a predetermined threshold, and thus, may modify database 304 to replace the "WARM" tag assigned to product ID 1 with a "HOT" tag. In some embodiments, one or more processors 305 may re-evaluate the difference between the temperature associated with the product tag in database 304 and the actual temperature at the region with the highest customer demand a predetermined number of times before replacing the product tag with a new product tag. For example, one or more processors 305 may re-evaluate the difference two times a day for a period of two days to confirm that the difference indeed exceeds a predetermined threshold prior to replacing the product tag with a new product tag. If the difference does not exceed a predetermined threshold, one or more processors 305 may maintain the original product tag assigned to the product.

In some embodiments, the machine learning algorithm(s) may calculate weights for the generated correlations. For example, the machine learning algorithm(s) may receive product attributes associated with a product, such as a brand of the product, a material of the product, and a package size of the product. As discussed above, the machine learning algorithm(s) may generate a combination of correlations between each product attribute and a product tag associated with the product, e.g., brand-product tag correlation, material-product tag correlation, and package size-product tag correlation. Each of the correlations generated may be weighted differently based on the extent to which each product attribute may affect placement of the product at one or more FCs 200. For example, package size-product tag correlation may be weighted more than brand-product tag correlation because the package size of the product may be more likely than the brand of the product to affect the product's placement at one or more FCs 200 due to building restrictions associated with FCs 200. Based on the correlation weights determined, one or more processors 305 may determine product placement rules. For example, if there are more products assigned for inventory placement at a particular FC 200 than the amount of available space in the particular FC 200, one or more processors 305 may need to determine which products should be prioritized over other products with the same product tag based on the product placement rules. In some embodiments, one or more processors 305 may prioritize products with correlation weights that are higher than other products with correlation weights that are lower, even though the products may be assigned the same product tag.

Once the FC tags and/or the product tags have been re-evaluated periodically, method 600 may proceed to block 605. At block 605, similar to block 506 in FIG. 5, one or more processors 305 may assign the product for placement in an FC associated with an FC tag that corresponds to the product tag assigned to the product. By way of example, one or more processors 305 may assign the product for placement in an FC with an FC tag that matches the product tag assigned to the product. As seen in FIG. 4A, database 304 may store a list of FCs and their corresponding FC tags, e.g., temperature tags. The FC tag, therefore, may be indicative of a temperature associated with a location of the FC. At block 605, one or more processors 305 may identify an FC in database 304 with an FC tag that matches the product tag assigned to the product and assign the product for placement in the FC. For example, the product may be assigned a "WARM" product tag. One or more processors 305 may identify an FC in database 304 with a "WARM" FC tag on the expected date of shipment of the product and assign the product for placement in the FC.

If there is more than one FC with an FC tag that matches the product tag assigned to the product, e.g., five FCs with the "WARM" FC tag, one or more processors 305 may identify other parameters associated with the one or more FCs and select an optimal FC for the product. For example, one or more processors 305 may determine, among other things, number of serving area(s) for each FC, location of the serving area(s) for each FC, temperature at the serving area(s) for each FC on the expected date of shipment, distance between the FC and the serving area(s), maximum capacity of each FC, building restrictions associated with each FC, or any combination thereof. Based on one or more of the aforementioned parameters, one or more processors 305 may select an optimal FC for the product. In some embodiments, the optimal FC may have one or more serving areas located closest to the region with the highest demand for the product. In other embodiments, the optimal FC may have one or more serving areas that are associated with a temperature closest to the temperature indicated by the product tag assigned to the product. In yet another embodiment, the optimal FC may have the largest capacity and flexible building restrictions to accommodate the requirements for storing the product. For example, if the product must be kept frozen, the optimal FC must have the ability to store and maintain frozen products.

Method 600 may continue to block 606, at which one or more processors 305 may receive a customer order from a customer for a particular product. For example, external front end system 103 may receive an order from device 102A or device 102B in FIG. 1A. Upon receipt of the customer order, one or more processors 305 may consult database 304 to determine at which FC 200 the particular product is placed for inventory. For example, the particular product may be assigned for inventory placement at different FCs 200 throughout the year due to seasonal changes at one or more locations of FCs 200, As such, one or more processors 305 may identify FC 200, at which the particular product in the customer order is placed. In some embodiments, one or more processors 305 may also determine a quantity of the particular product that is available at the FC 200 with the particular product.

Once one or more processors 305 identifies FC 200, at which the particular product is placed, method 600 may proceed to block 607. At block 607, one or more processors 305 may source the particular product from the identified FC 200 for delivery to the customer. By assigning products for inventory placement at one or more FCs 200 based on a temperature at a region with the highest customer demand for each product and a temperature at a location of each FC 200, one or more processors 305 may be able to source products from customer orders efficiently, thereby reducing shipping costs, processor load, and delivery time.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for managing inventory placement, the system comprising:
a memory storing instructions; and
at least one processor configured to execute the instructions to:
receive, from a remote system, an identifier of a product for inventory placement;
determine, based on historical shipment data stored in a database, a region with the highest customer demand for the product;
predict, using a machine learning algorithm, a product tag associated with the product based on at least a temperature associated with the region with the highest customer demand for the product;
modify the database to assign the product tag to the product identifier; and
assign the product for placement in a fulfillment center, wherein the fulfillment center is associated with a fulfillment center tag corresponding to the product tag.

2. The system of claim 1, wherein the fulfillment center tag is indicative of a temperature associated with a location of the fulfillment center.

3. The system of claim 1, wherein the product tag is dynamically adjustable based on the temperature associated with the region and a date of shipment.

4. The system of claim 2, wherein the fulfillment center tag is dynamically adjustable based on the temperature associated with the location of the fulfillment center.

5. The system of claim 1, wherein the at least one processor is further configured to execute the instructions to:
modify the database to assign, using the machine learning algorithm, a fulfillment center tag to a fulfillment center based on at least one of temperature associated with a location of the fulfillment center, temperature associated with a serving area of the fulfillment center, or a parameter associated with the fulfillment center.

6. The system of claim 5, wherein the parameter associated with the fulfillment center comprises at least one of maximum capacity, building restriction, distance between the fulfillment center and the serving area, or number of serving areas.

7. The system of claim 1, wherein the at least one processor is further configured to execute the instructions to:
store information associated with the product in the database, wherein the information comprises the product tag assigned to the product; and
train the machine learning algorithm to automatically assign product tags to new products based on the information stored in the database.

8. The system of claim 1, wherein the fulfillment center tag matches the product tag.

9. The system of claim 1, wherein the machine learning algorithm comprises a classification model.

10. The system of claim 1, wherein the at least one processor is further configured to execute the instructions to:
evaluate at least one of the product tag or the fulfillment center tag periodically, wherein evaluating at least one of the product tag or the fulfillment center tag comprises:
determining the temperature associated with at least one of the product tag or the fulfillment center tag;
determining an actual temperature associated with at least one of the region with the highest customer demand for the product or the location of the fulfillment center;
calculating a difference between the temperature with the actual temperature; and
replacing at least one of the product tag or the fulfillment center tag with a new tag when the difference exceeds a predetermined threshold.

11. A computer-implemented method for managing inventory placement, the method comprising:
receiving, from a remote system, an identifier of a product for inventory placement;
determining, based on historical shipment data stored in a database, a region with the highest customer demand for the product;
predicting, using a machine learning algorithm, a product tag associated with the product based on at least a temperature associated with the region with the highest customer demand for the product;

modifying the database to assign the product tag to the product identifier; and assigning the product for placement in a fulfillment center, wherein the fulfillment center is associated with a fulfillment center tag corresponding to the product tag.

12. The method of claim 11, wherein the fulfillment center tag is indicative of a temperature associated with a location of the fulfillment center.

13. The method of claim 11, wherein the product tag is dynamically adjustable based on the temperature associated with the region and a date of shipment.

14. The method of claim 12, wherein the fulfillment center tag is dynamically adjustable based on the temperature associated with the location of the fulfillment center.

15. The method of claim 11, further comprising:
modify the database to assign, using the machine learning algorithm, a fulfillment center tag to a fulfillment center based on at least one of temperature associated with a location of the fulfillment center, temperature associated with a serving area of the fulfillment center, or a parameter associated with the fulfillment center.

16. The method of claim 15, wherein the parameter associated with the fulfillment center comprises at least one of maximum capacity, building restriction, distance between the fulfillment center and the serving area, or number of serving areas.

17. The method of claim 11, further comprising:
storing information associated with the product in the database, wherein the information comprises the product tag assigned to the product; and
training the machine learning algorithm to automatically assign product tags to new products based on the information stored in the database.

18. The method of claim 11, wherein the machine learning algorithm comprises a classification model.

19. The method of claim 11, further comprising:
evaluating at least one of the product tag or the fulfillment center tag periodically, wherein evaluating at least one of the product tag or the fulfillment center tag comprises:
determining the temperature associated with at least one of the product tag or the fulfillment center tag;
determining an actual temperature associated with at least one of the region with the highest customer demand for the product or the location of the fulfillment center;
calculating a difference between the temperature with the actual temperature; and
replacing at least one of the product tag or the fulfillment center tag with a new tag when the difference exceeds a predetermined threshold.

20. A computer-implemented system for managing inventory placement, the system comprising:
a memory storing instructions; and
at least one processor configured to execute the instructions to:
receive, from a remote system, an identifier of a product for inventory placement;
determine, based on historical shipment data stored in a database, a region with the highest customer demand for the product;
predict, using a classification model, a product tag associated with the product based on at least a temperature associated with the region with the highest customer demand for the product;
modify the database to assign the product tag to the product identifier;
store information associated with the product in the database, the information comprising the product tag assigned to the product and the product identifier;
train the classification model to automatically assign product tags to new products, based on the information stored in the database;
identify a fulfillment center associated with a fulfillment center tag that matches the product tag, wherein:
the fulfillment center tag is indicative of a temperature associated with a location of the fulfillment center; and
identifying the fulfillment center comprises determining at least one of maximum capacity or building restriction associated with the fulfillment center;
modify the database to assign the product for placement in the identified fulfillment center; and
evaluate at least one of the product tag or the fulfillment center tag periodically, wherein evaluating at least one of the product tag or the fulfillment center tag comprises:
determining the temperature associated with at least one of the product tag or the fulfillment center tag;
determining an actual temperature associated with at least one of the region with the highest customer demand for the product or the location of the fulfillment center;
calculating a difference between the temperature with the actual temperature; and
replacing at least one of the product tag or the fulfillment center tag with a new tag when the difference exceeds a predetermined threshold.

* * * * *